(12) United States Patent
Gv et al.

(10) Patent No.: US 8,556,769 B1
(45) Date of Patent: Oct. 15, 2013

(54) HYBRID TRANSMISSION WITH SINGLE PLANETARY GEAR SET AND MULTIPLE OPERATING MODES

(71) Applicant: GM Global Technology Operations LLC, Detroit, MI (US)

(72) Inventors: Ravikanth Gv, Karnataka (IN); Alle Kumar Naveen, Pradesh (IN); Kumpatla V Naidu, Karnataka (IN); Sriram Ravichandran, Karnataka (IN)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/651,507

(22) Filed: Oct. 15, 2012

(51) Int. Cl.
*F16H 3/44* (2006.01)
(52) U.S. Cl.
USPC .............................................. 475/286; 475/5
(58) Field of Classification Search
USPC ................... 475/5, 150, 151, 271–291; 477/5
See application file for complete search history.

(56) References Cited

U.S. PATENT DOCUMENTS

| | | | | |
|---|---|---|---|---|
| 2004/0121870 A1* | 6/2004 | Takenaka et al. | ................. | 475/5 |
| 2011/0111905 A1* | 5/2011 | Tiwari et al. | ..................... | 475/2 |
| 2011/0275466 A1* | 11/2011 | Rask et al. | ........................ | 475/5 |
| 2013/0006460 A1* | 1/2013 | Endo et al. | ...................... | 701/22 |

* cited by examiner

*Primary Examiner* — Justin Holmes
*Assistant Examiner* — Huan Le
(74) *Attorney, Agent, or Firm* — Quinn Law Group, PLLC

(57) ABSTRACT

A powertrain is provided that includes a hybrid transmission with an input member, an output member, and a stationary member, and a first and a second electric machine. Only a single planetary gear set having a first member, a second member, and a third member is operatively connected between the input member and the output member. The first, the second, and the third members include a ring gear member, a sun gear member, and a carrier member. The powertrain includes a first, a second, a third, and a fourth selectively engageable torque-transmitting mechanism. Selective engagement of a different one or ones of the torque-transmitting mechanisms and selective operation of one or both electric machines establishes a series operating mode, an input-split operating mode, at least one electric-only operating mode, and at least one fixed gear operating mode between the input member and the output member.

20 Claims, 2 Drawing Sheets

|     | C1 | C2 | C3 | C4 | E  |
| --- | --- | --- | --- | --- | --- |
| EV1 | X  |    |    |    | -- |
| EVT | X  | X  |    |    | O  |
| S   | X  |    |    | X  | O  |
| FG1 |    | X  | X  |    | O  |
| FG2 | X  | X  | X  |    | O  |
| eTC |    | X  |    |    | O  |
| N   |    |    |    |    | -- |
| NC  |    |    |    | X  | O  |
| EV2 |    | X  |    |    | -- |
| EV3 | X  | X  |    |    | -- |

FIG. 3

HYBRID TRANSMISSION WITH SINGLE PLANETARY GEAR SET AND MULTIPLE OPERATING MODES

TECHNICAL FIELD

The present teachings generally relate to a hybrid transmission having only one planetary gear set.

BACKGROUND

Various hybrid and electric powertrain architectures are known for managing the input and output torques of various prime movers in hybrid vehicles, most commonly internal combustion engines and electric machines. Some electrically-variable transmissions (EVTs) provide for continuously variable speed ratios by combining features from both series and parallel hybrid power train architectures. EVTs are operable in fixed gears with a direct mechanical path between an internal combustion engine and a final drive unit, thus enabling high transmission efficiency and application of lower cost and less massive motor hardware. EVTs are also operable with the engine mechanically independent from the final drive or in various mechanical/electrical split contributions thereby enabling high-torque, continuously variable speed ratios, electrically-dominated launches, regenerative braking, and engine off idling.

Some hybrid vehicles utilize larger battery packs, adding to the vehicle weight, increasing fuel consumption and vehicle cost. These vehicles operate in an electric-only mode over a predetermined driving range, and then the engine charges the battery through one of the motor/generators when driving beyond the optimal range. A lower battery state of charge and the higher fuel consumption required in charging the battery is generally undesirable with respect to range, endurance, and durability of a hybrid vehicle. The rate of discharge of battery and engine power are calculated based on driver commanded throttle and vehicle speed

SUMMARY

A hybrid powertrain of relatively low content and weight is provided that has multiple operating modes to decrease fuel consumption and the rate of battery discharge. The powertrain includes a hybrid transmission with an input member, an output member, and a stationary member. The hybrid transmission has a first and a second electric machine, both of which may be electric motor/generators. Only a single planetary gear set having a first member, a second member, and a third member is operatively connected between the input member and the output member. The first, the second, and the third members include a ring gear member, a sun gear member, and a carrier member. The carrier member supports pinion gears that mesh with both the ring gear member and the sun gear member.

The powertrain includes a first, a second, a third, and a fourth selectively engageable torque-transmitting mechanism. The first torque-transmitting mechanism is selectively engageable to operatively connect the second electric machine with the output member. The second torque-transmitting mechanism is selectively engageable to operatively connect the second member with the output member such that the output member rotates commonly with the second member. The third torque-transmitting mechanism is selectively engageable to operatively connect the third member to the stationary member. The fourth torque-transmitting mechanism is selectively engageable to operatively connect the second member to the stationary member. Selective engagement of a different one or ones of the torque-transmitting mechanisms and selective operation of one or both electric machines establishes a series operating mode, an input-split operating mode, an electric-only operating mode, and a fixed gear operating mode between the input member and the output member.

The powertrain is thus a low content hybrid powertrain of relatively low weight for increased fuel economy and increased electric range. The powertrain can be used on a relatively small vehicle, providing an input-split operating mode that enables high efficiency at relatively low speeds, and a series mode for extended range. The input-split operating mode has underdrive and overdrive capability. A fixed gear operating mode can be an underdrive ratio, and an electric assist ratio can be available for towing purposes. The operative connections of the torque-transmitting mechanisms provide limp home modes in case of failure of the engine, and also in case of failure of the electric machines.

The above features and advantages and other features and advantages of the present teachings are readily apparent from the following detailed description of the best modes for carrying out the present teachings when taken in connection with the accompanying drawings.

BRIEF DESCRIPTION OF THE DRAWINGS

FIG. 3 is a table showing operating modes of the hybrid powertrain of FIGS. 1 and 2.

DETAILED DESCRIPTION

Figure 1:
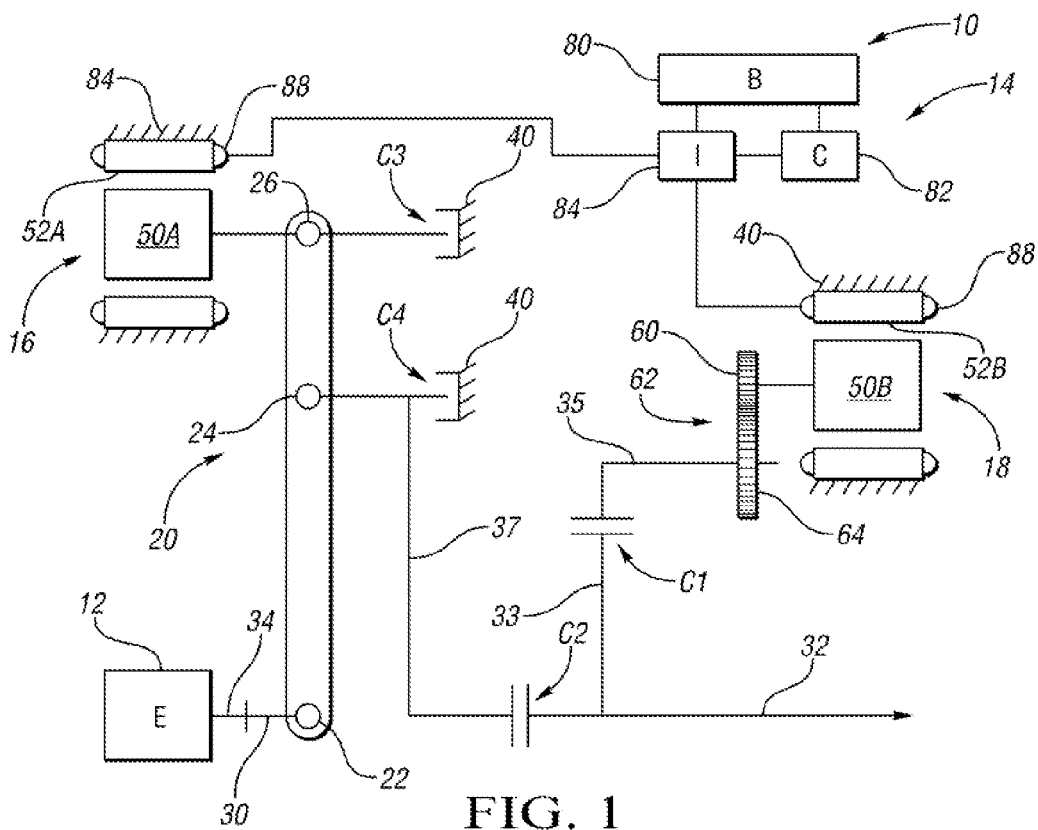
FIG. 1 is a schematic illustration in lever diagram form of a hybrid powertrain having a hybrid transmission and an engine.

Referring to the drawings, FIG. 1 shows a hybrid powertrain 10 for a vehicle. The hybrid powertrain 10 includes a prime mover, such as an internal combustion engine 12, labeled E, connected with a hybrid transmission 14. Other types of prime movers, such as fuel cells, pneumatic engines, etc. may be used in place of an internal combustion engine 12. The hybrid transmission 14 includes two additional motive sources, a first electric machine 16 and a second electric machine 18. The engine 12 and electric machines 16 and 18 are interconnectable via a single planetary gear set 20 and selective engagement of torque-transmitting mechanisms C1, C2, C3, C4 to provide various operating modes as discussed herein.

The planetary gear set 20 includes a first member 22, a second member 24, and a third member 26. The members 22, 24, and 26 include, in any order, a sun gear member, a ring gear member, and a carrier member. The carrier member rotatably supports pinion gears that mesh with both the sun gear member and the ring gear member. In one embodiment shown in FIG. 2, the first member 22 is a sun gear member, the second member 24 is a carrier member, and the third member 26 is a ring gear member. A plurality of pinion gears 27 mesh with both the sun gear member 22 and the ring gear member 24. A person of ordinary skill in the art will understand the structure of the simple planetary gear set 20, which is shown only schematically in lever diagram form in FIG. 1.

The hybrid transmission 14 has an input member 30 and an output member 32. A drive member 34, such as a crankshaft, of the engine 12 is connected with the input member 30 so that the drive member 34 rotates commonly with the input member 30 (i.e., at the same speed as the input member 30). As used herein, "common rotation" means rotation at the same speed, including a speed of zero (e.g., when grounded to a stationary member). Optionally, a ratio multiplying connection to the engine crankshaft, such as a geared connection or a series of pulleys and sprockets may operatively connect the crankshaft 34 and the input member 30. Optionally, a dampener may be positioned between the drive member 34 and the input member 30. The input member 30 is continuously connected for common rotation with the first member 22. The output member 32 is not continuously operatively connected with any member of the planetary gear set 20 or with either electric machine 16 or 18. The output member 32 is connected through a final drive mechanism (not shown) to vehicle wheels (also not shown) to provide tractive power to the wheels to propel the vehicle. The planetary gear set 20 is the only planetary gear set that is operatively connected or connectable between the input member 30 and the output member 32. The hybrid transmission 14 and the powertrain 12 thus have only a single planetary gear set 20.

The output member 32 is selectively operatively connected with the second electric machine 18 by engagement of the first torque-transmitting mechanism C1, and is selectively operatively connected with the second member 24 of the planetary gear set 20 by engagement of the second torque-transmitting mechanism C2. Specifically, a hub 33 extending from the output member 32 is connected for common rotation with a hub 35 extending from a second gear 64 of the gear train 62 when the torque-transmitting mechanism C1 is engaged. A hub 37 extending from the second member 24 is connected for common rotation with the output member 32 when the second torque-transmitting mechanism C2 is engaged. When neither of the torque-transmitting mechanisms C1 and C2 are engaged, the output member 32 is not operatively connected with the first electric machine 16, the second electric machine 18, or the engine 12.

The third member 26 of the planetary gear set 20 is selectively operatively connected with a stationary member 40 by engagement of the third torque-transmitting mechanism C3. The stationary member 40 is a non-rotatable member such as a transmission casing. Accordingly, when the third member 26 is connected to the stationary member 40, the third member 26 does not rotate. The second member 24 of the planetary gear set 20 is selectively operatively connected to the stationary member 40 by engagement of the fourth torque-transmitting mechanism C4.

The first electric machine 16 includes a rotor 50A that is continuously connected for common rotation with the third member 26 of the planetary gear set 20. The first electric machine 16 also includes a stator 52A that radially surrounds the rotor 50A. The stator 52A is grounded to the stationary member 40 or to a different stationary member such as a motor housing of the first electric machine 16.

The second electric machine 18 includes a rotor 50B and a stator 52B that radially surrounds the rotor 50B. The stator 52B is grounded to the stationary member 40 or to a different stationary member such as a motor housing of the second electric machine 18. Both of the electric machines 16, 18 can be motor/generators that are selectively operable both as a motor and as a generator.

The rotor 50B is connected for common rotation with a first gear 60 of a gear train 62. The first gear 60 meshes with the second gear 64. The second gear 64 is operatively connected with the output member 32 by engagement of the torque-transmitting mechanism C1. The first gear 60 is configured to have a smaller diameter and fewer teeth than the second gear 64. Accordingly, a speed reduction occurs when torque is transferred from the electric machine 18 to the output member 32. That is, the rotor 50B rotates faster than the output member 32 when the torque-transmitting mechanism C1 is engaged. The speed reduction enables electric launch when torque-transmitting mechanism C1 is engaged, as discussed herein. The gear train 62 can also be referred to as a spur gear, or a pair of gears configured to transmit torque between parallel shafts. In other embodiments, the first gear 60 could be configured to have a larger diameter and more teeth than the second gear 64, enabling a speed multiplication through the gear train 62, if needed for a particular application.

The stators 52A, 52B of the electric machines 16 and 18 are operatively connected to an energy storage device 80 that may be one or more batteries, labeled B in FIG. 1. Other electric storage devices that have the ability to store electric power and dispense electric power may be used in place of the batteries. A controller 82, labeled C in FIG. 1, is operatively connected to the electric machines 16 and 18 and monitors the speed of the rotors 50A, 50B. The controller 82 also receives information regarding engine speed, either from a separate engine controller, or by connection to the engine 12. Based on this and other vehicle operating conditions, such as driver accelerator commands, the controller 82 is operable to provide electrical energy from the energy storage device 80 through a power inverter 84, labeled I in FIG. 1, to either or both electric machines 16 and 18 to cause the electric machines 16, 18 to function as motors, adding torque to the transmission 14. The power inverter 84 converts direct current to alternating current when electrical power is provided to the electric machines 16 and/or 18.

If the information received by the controller 82 indicates that either electric machine 16 or 18 should be operated as a generator, converting mechanical energy into electrical energy, the controller 82 is operable to cause the power inverter 84 to convert alternating current provided from either electric machine 16 or 18 into direct current stored in the energy storage device 80. The lines in FIGS. 1 and 2 connecting the electric machines 16, 18, the energy storage device 80, the controller 82, the inverter 84, and stator windings 88 of the stators 52A, 52B represent transfer conductors for relaying electrical current or signals between the components.

Optionally, instead of a single controller 82, each electric machine 16, 18 can have a separate, integrated controller and inverter, with the separate controllers of the electric machines 16, 18 operatively connected to one another.

The torque-transmitting mechanisms C1, C2, C3, C4 can be controlled by the same controller 82, or may be controlled by a separate transmission controller, not shown, that is operatively connected with the controller 82 and with a separate engine controller. The torque-transmitting mechanisms C1, C2, C3 and C4 can be actuated in any suitable manner, such as hydraulically, electrically, or electro-magnetically. Torque-transmitting mechanisms C1 and C2 are clutches, and torque-transmitting mechanisms C3 and C4 are brakes.

FIG. 3 is a table indicating the engagement status of each of torque-transmitting mechanisms C1, C2, C3 and C4, as well as the operating status of the engine 12 (whether on or off (i.e., fuel cut off)) to establish eight different forward propulsion modes as well as a neutral mode and a neutral charging mode as described herein. In FIG. 3, an "X" indicates that the torque-transmitting mechanism represented by the column is engaged. A box that is empty indicates that the corresponding torque-transmitting mechanism represented by the column is not engaged (i.e., is "open"). An "0" indicates that the engine 12 is on. A box that has two dashed lines "- -" in the column representing the engine 12 indicates that the engine 12 is off (i.e., fuel is cut off).

In FIG. 3, the row marked EV1 indicates a first electric-only operating mode. An "electric-only" operating mode is a mode in which the engine 12 is off (i.e., fuel is cut off) and all torque at the output member 32 is provided via one or both of the electric machines 16, 18 using stored energy from the energy storage device 80. In the electric-operating mode EV1, torque-transmitting mechanism C1 is engaged to operatively connect the second electric machine 18 with the output member 32. The second electric machine 18 can be controlled to operate as a motor, using stored energy from the energy storage device 80 to provide torque at the output member 32, either in the forward direction or the reverse direction. The gear train 62 reduces the speed of rotation of the second gear 64 relative to the gear 60, thus multiplying torque from the electric machine 18 to the output member 32. The first electric-only operating mode EV1 can be used to launch a vehicle that has the powertrain 10. The engine 12 is (i.e., fuel is cut off) and the electric machine 16 can be unpowered, although both can be spinning as neither is operatively connected to the output member 32 because the second torque-transmitting mechanism C2 is not engaged. The second electric machine 18 can be a motor/generator, so that it is also operable as a generator, such as during deceleration of the vehicle to capture regenerative energy and change the energy storage device 80.

The row labeled EVT in FIG. 3 represents an electrically-variable operating mode in which the torque-transmitting mechanisms C1 and C2 are engaged, and the engine 12 is on. Torque from the engine 12 and the first electric machine 16 is split through the planetary gear set 20 and provided at the output member 32 due to the engaged torque-transmitting mechanism C2. The EVT is an input-split operating mode. The second electric machine 18 is controlled to provide torque at the output member 32 at a speed proportional to the speed of the output member 32 through the gear train 32. During the electrically-variable operating mode, the electric machine 16 is controlled to operate as a motor or as a generator in order to provide the torque commanded at the output member 32. The engine 12 can operate at predetermined efficient operating parameters (speed and torque) to improve fuel economy while the speed of the electric machine 16 is varied to meet the speed requirements of the output member 62. Torque of the electric machines 16, 18 can be varied to meet the torque requirements of the output member 32. The range of speeds possible during the EVT mode includes underdrive and overdrive speed ratios.

The row labeled S in FIG. 3 represents a hybrid series operating mode in which the first and fourth torque-transmitting mechanisms C1 and C4 are engaged and the engine 12 is on. The electric machine 18 is operatively connected to the output member 32 through the gear train 62, and is controlled to function as a motor, to provide the torque commanded at the output member 32. Power is provided to the electric machine 18 by the electric machine 16, which is controlled to function as a generator and runs at a negative speed, converting torque supplied by the engine 12 through the planetary gear set 20 to electric power supplied to the electric machine 18. Any power generated by the electric machine 16 that is not needed by the electric machine 18 to meet the required torque at the output member 32 is used to charge the energy storage device 80. Similarly, if power generated by electric machine 16 is less than that required to meet the required torque at the output member 32, electric machine 18 draws the remaining necessary power from the energy storage device 80. With the engine 12 powering the electric machine 16 to function as a generator, the range of a vehicle with the powertrain 10 is extended in comparison to the range of the electric-only operating mode, which is limited by the state-of-charge of the energy storage device 80. Additionally, this operating mode enables the engine 12 to be operated at the predetermined efficient operating parameters (speed and torque), as the engine 12 is mechanically decoupled from the output member 32.

Figure 2:
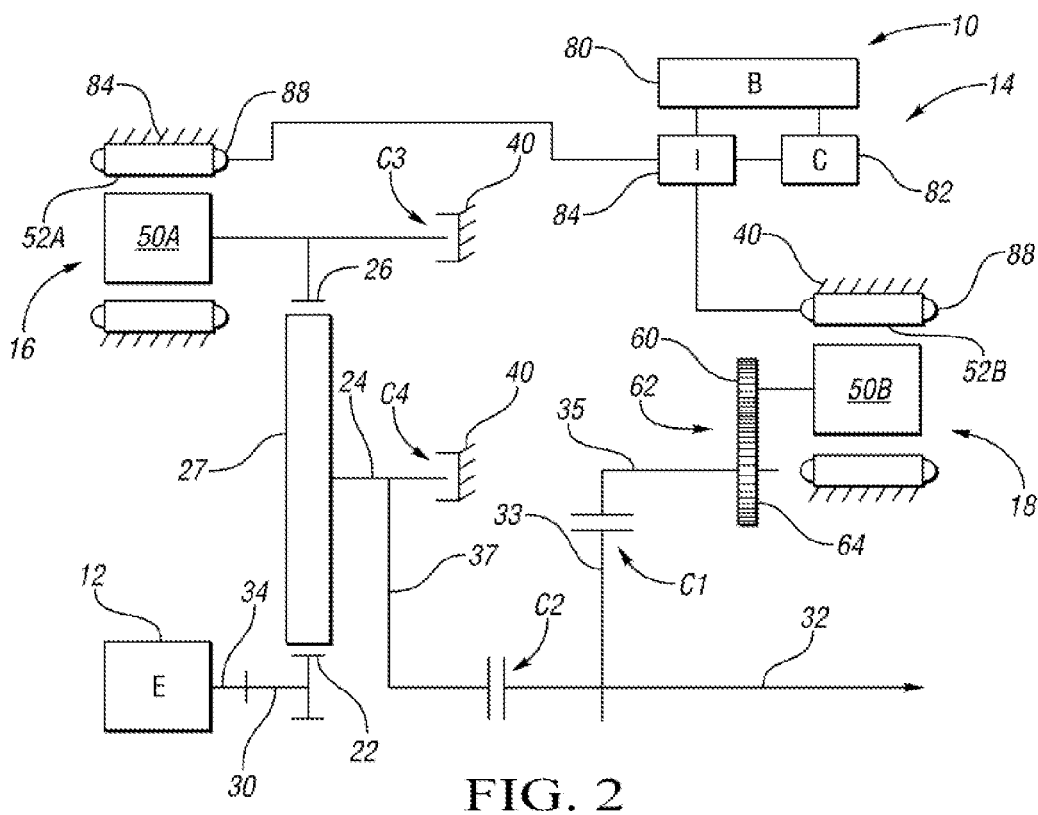
FIG. 2 is a schematic illustration in stick diagram form of one embodiment of the hybrid powertrain and hybrid transmission of FIG. 1.

The row labeled FG1 in FIG. 3 represents a first fixed gear operating mode with a first fixed gear ratio from the input member 30 to the output member 32. In the mode FG1, the second and third torque-transmitting mechanisms C2, C3 are engaged and the engine 12 is on. The electric machines 16 and 18 are not powered. The rotor 50A is held stationary by the engaged torque-transmitting mechanism C3 which holds the third member 26 stationary. The electric machine 18 is not operatively connected to the output member 32 because the torque-transmitting mechanism C1 is not engaged. Torque is provided from the engine 12 through the planetary gear set 20 to the output member 32 at a first fixed gear ratio that is dependent on the tooth counts of the ring gear member and the sun gear member of the planetary gear set 20. In the embodiment of FIG. 2, the mode FG1 is an underdrive mode. The first fixed gear FG1 is a mechanical point as all power flowing from the input member 30 to the output member 32 is along a mechanical power path. The first fixed gear FG1 is appropriate while cruising at mid speeds along a speed range of a vehicle on which the powertrain 10 is installed. The first fixed gear FG1 can also be employed as a limp home mode in case of failure of either of the electric machines 16, 18, or in case the state-of-charge of the energy storage device 80 is below a predetermined minimum state-of-charge ("dead battery"). The powertrain 10 can be shifted from the electrically-variable mode EVT to the first fixed gear mode FG1 by releasing the torque-transmitting mechanism C1 and engaging the torque-transmitting mechanism C3 while the torque-transmitting mechanism C2 remains engaged with the engine 12 on.

The row labeled FG2 in FIG. 3 represents a second fixed gear ratio from the input member 30 to the output member 32 in which the first, second, and third torque-transmitting mechanisms C1, C2, C3 are engaged and the engine 12 is on. The electric machine 16 is not powered. The rotor 50A is held stationary by the engaged torque-transmitting mechanism C3 which holds the third member 26 stationary. The electric machine 18 is operatively connected to the output member 32 because the torque-transmitting mechanism C1 is engaged. Torque is provided from the engine 12 through the planetary gear set 20 to the output member 32 at a fixed gear ratio dependent on the tooth counts of the ring gear member and the sun gear member of the planetary gear set 20. The fixed gear ratio of FG2 is an underdrive ratio if the planetary gear set 20 is arranged as indicated in the embodiment of FIG. 2. Torque is also provided by the second electric machine 18, and can be used to cruise at a slightly higher speed than that of the first fixed gear FG1 or can be used to add torque at the output member 32 to assist in towing. The torque provided by the second electric machine 18 provides an electric assist ratio at the output member 32, establishing the fixed gear ratio FG2 close to the mechanical point. The ratio provided by the planetary gear set 20 with the third member 26 stationary is configured to match the ratio provided by the gear train 62 to enable longevity of the torque-transmitting mechanisms C1 and C2. With the planetary gear set 20 arranged as indicated in FIG. 2, the first fixed gear FG1 is an underdrive ratio.

The row labeled eTC in FIG. 3 represents an electric torque converter mode in which the second torque-transmitting mechanism C2 is engaged and the engine 12 is on. The first electric machine 16 is controlled to function as a motor and the engine 12 is on. The first electric machine 16 provides balancing torque for the engine 12 so that both the first electric machine 16 and the engine 12 provide torque to the output member 32 through the planetary gear set 20. The second electric machine 18 is not operatively connected to the output member 32 as the torque-transmitting mechanism C1 is not engaged.

The row labeled N in FIG. 3 represents a neutral mode, in which none of the torque-transmitting mechanism C1, C2, C3 and C4 are engaged, and the engine 12 is off (i.e., fuel is cut off). Because none of the torque-transmitting mechanisms C1, C2, C3 and C4 are engaged, none of the power sources (engine 12, electric machines 16, 18) are operatively connected to the output member 32.

The row labeled NC in FIG. 3 is a neutral charging mode in which the engine 12 is on and the fourth torque-transmitting mechanism C4 is engaged. Because neither torque-transmitting C1 nor torque-transmitting mechanism C2 is engaged, none of the power sources (engine 12, electric machines 16, 18) are operatively connected to the output member 32. With the fourth torque-transmitting mechanism C4 engaged, the torque of the engine 12 can be transferred from the first member 22 to the third member 26 through the planetary gear set 20. The controller 82 can control the electric machine 16 to function as a generator, so that the torque provided at the third member 26 is converted to electric energy stored in the energy storage device 80.

The row labeled EV2 in FIG. 3 is a second electric-only operating mode in which the torque-transmitting mechanism C2 is engaged and the engine 12 is off (i.e., fuel is cut off). The electric machine 16 can be controlled to function as a motor to provide torque to the output member 32 through the planetary gear set 20 to the extent that the engine 12 can act as a brake, with the friction of the engine 12 in the off-state resisting rotation of the first member 22. The electric machine 18 is also controlled to function as a motor.

Similarly, the row labeled EV3 in FIG. 3 is a third electric-only operating mode in which the torque-transmitting mechanisms C1 and C2 are engaged, with the engine 12 off (i.e., fuel is cut off) and both electric machines 16, 18 controlled to function as motors to provide torque at the output member 32. The rotor 50B of the electric motor 18 rotates at a speed proportional to the speed of the output member 32 through the gear train 62. The third electric-only operating mode is provided to the extent that the engine 12 can act as a brake, with the friction of the engine 12 in the off-state resisting rotation of the first member 22. The third electric-only operating mode may be used as a transitional range state during a start of the engine 12.

While the best modes for carrying out the many aspects of the present teachings have been described in detail, those familiar with the art to which these teachings relate will recognize various alternative aspects for practicing the present teachings that are within the scope of the appended claims.

The invention claimed is:

1. A powertrain comprising:
an input member;
an output member;
a stationary member;
a first and a second electric machine;
only a single planetary gear set operatively connectable between the input member and the output member and having a first member, a second member, and a third member; wherein the first, the second, and the third members include a ring gear member, a sun gear member, and a carrier member that supports pinion gears that mesh with both the ring gear member and the sun gear member;
a first, a second, a third, and a fourth selectively engageable torque-transmitting mechanism; wherein the first torque-transmitting mechanism is selectively engageable to operatively connect the second electric machine with the output member; wherein the second torque-transmitting mechanism is selectively engageable to operatively connect the second member with the output member such that the output member rotates commonly with the second member; wherein the third torque-transmitting mechanism is selectively engageable to operatively connect the third member to the stationary member; wherein the fourth torque-transmitting mechanism is selectively engageable to operatively connect the second member to the stationary member; and
wherein selective engagement of a different one or ones of the torque-transmitting mechanisms and selective operation of one or both electric machines establishes a series operating mode, an input-split operating mode, an electric-only operating mode, and a fixed gear operating mode between the input member and the output member.

2. The powertrain of claim 1, further comprising a gear train operatively connecting the second electric machine with the output member when the first torque-transmitting mechanism is engaged.

3. The powertrain of claim 1, wherein the first and the fourth torque transmitting mechanisms are engaged, the first electric machine is operated as a generator, and the second electric machine is operated as a motor in the series operating mode.

4. The powertrain of claim 1, wherein the first and the second torque transmitting mechanisms are engaged, the first electric machine is operated as a motor or as a generator, and the second electric machine is operated as a motor in the input-split operating mode.

5. The powertrain of claim 1, wherein the first torque transmitting mechanism is engaged and the second electric machine is operated as a motor in the electric-only operating mode.

6. The powertrain of claim 1, wherein the second torque transmitting mechanism is engaged and the first electric machine is operated as a motor in the electric-only operating mode.

7. The powertrain of claim 1, wherein the first torque transmitting mechanism and the second torque-transmitting mechanism are engaged and both the first and the second electric machines are operated as motors in the electric-only operating mode.

8. The powertrain of claim 1, wherein the second and the third torque-transmitting mechanisms are engaged in the fixed operating mode.

9. The powertrain of claim 1, wherein the first, the second, and the third torque-transmitting mechanisms are engaged in the fixed operating mode and the second electric machine adds torque at the output member.

10. The powertrain of claim 1, wherein the second torque-transmitting mechanism is engaged and the first electric machine is operated as a motor or as a generator in an electric torque converter operating mode.

11. The powertrain of claim 1, wherein the fourth torque-transmitting mechanism is engaged and the first electric machine is operated as a generator in a neutral charging operating mode.

12. A powertrain comprising:
an input member;
an output member;
a stationary member;
a first and a second electric machine;
a gear train operatively connecting the second electric machine with the output member; wherein the gear train is configured to reduce speed from the second electric machine to the output member;
only a single planetary gear set having a first member, a second member, and a third member; wherein the first, the second, and the third members include a ring gear member, a sun gear member, and a carrier member that supports pinion gears that mesh with both the ring gear member and the sun gear member;
a first, a second, a third, and a fourth selectively engageable torque-transmitting mechanism; wherein the first torque-transmitting mechanism is selectively engageable to operatively connect the second electric machine with the output member; wherein the second torque-transmitting mechanism is selectively engageable to operatively connect the second member with the output member such that the output member rotates commonly with the second member; wherein the third torque-transmitting mechanism is selectively engageable to operatively connect the third member to the stationary member; wherein the fourth torque-transmitting mechanism is selectively engageable to operatively connect the second member to the stationary member, neither of the electric machines being continuously operatively connected with the output member;
wherein selective engagement of a different one or ones of the torque-transmitting mechanisms and selective operation of one or both electric machines establishes a series operating mode, an input-split operating mode, three electric-only operating modes, and two fixed gear operating modes between the input member and the output member.

13. The powertrain of claim 12, wherein the second torque-transmitting mechanism is engaged and the first electric machine is operated as a motor in an electric torque converter operating mode.

14. The powertrain of claim 12, wherein the first and the fourth torque transmitting mechanisms are engaged, the first electric machine is operated as a generator, and the second electric machine is operated as a motor in the series operating mode.

15. The powertrain of claim 12, wherein the first and the second torque transmitting mechanisms are engaged, the first electric machine is operated as a motor or as a generator, and the second electric machine is operated as a motor in the input-split operating mode.

16. The powertrain of claim 12, wherein the first torque transmitting mechanism is engaged and the second electric machine is operated as a motor in a first of the three electric-only operating modes;
wherein the second torque transmitting mechanism is engaged and the first electric machine is operated as a motor in a second of the three electric-only operating modes; and
wherein the first torque transmitting mechanism and the second torque-transmitting mechanism are engaged and both the first and the second electric machines are operated as motors in a third of the three electric-only operating modes.

17. The powertrain of claim 12, wherein the second and the third torque-transmitting mechanisms are engaged in a first of the two fixed operating modes; and
wherein the first, the second, and the third torque-transmitting mechanisms are engaged in a second of the two fixed operating modes.

18. A powertrain comprising:
an engine;
a hybrid transmission having:
an input member;
an output member;
a stationary member;
a first and a second electric machine;
only a single planetary gear set having a first member, a second member, and a third member; wherein the first, the second, and the third members include a ring gear member, a sun gear member, and a carrier member that supports pinion gears that mesh with both the ring gear member and the sun gear member;
a first, a second, a third, and a fourth selectively engageable torque-transmitting mechanism; wherein the first torque-transmitting mechanism is selectively engageable to operatively connect the second electric machine with the output member; wherein the second torque-transmitting mechanism is selectively engageable to operatively connect the second member with the output member such that the output member rotates commonly with the second member; wherein the third torque-transmitting mechanism is selectively engageable to operatively connect the third member to the stationary member; wherein the fourth torque-transmitting mechanism is selectively engageable to operatively connect the second member to the stationary member;
wherein selective engagement of a different one or ones of the torque-transmitting mechanisms, selective operation of the engine, and selective operation of one or both electric machines establishes:
a series operating mode in which the first and the fourth torque transmitting mechanisms are engaged, the engine is on, the first electric machine is operated as a generator, and the second electric machine is operated as a motor;
an input-split operating mode in which the first and the second torque transmitting mechanisms are engaged, the first electric machine is operated as a motor or as a generator, and the second electric machine is operated as a motor or as a generator;
an electric-only operating mode in which the first torque transmitting mechanism is engaged, the second electric machine is operated as a motor, and the first electric machine and the engine are off; and
a fixed gear operating mode in which the second and the third torque-transmitting mechanisms are engaged, the engine is on, and the electric machines are off.

19. The powertrain of claim 18, wherein the second torque-transmitting mechanism is engaged, the first electric machine is operated as a motor, and the engine is on in an electric torque converter operating mode.

20. The powertrain of claim 18, wherein the engine is controlled to operate at a predetermined speed and torque; wherein the fourth torque-transmitting mechanism is engaged, the first electric machine is operated as a generator receiving power from the engine in a neutral charging operating mode.

\* \* \* \* \*